US011556535B2

(12) United States Patent
Elliot et al.

(10) Patent No.: US 11,556,535 B2
(45) Date of Patent: Jan. 17, 2023

(54) LOW-LATENCY DATABASE SYSTEM

(71) Applicant: Palantir Technologies Inc., Denver, CO (US)

(72) Inventors: Mark Elliot, New York, NY (US); Joseph Ellis, Brooklyn, NY (US); Rahij Ramsharan, London (GB); Matthew Sills, New York, NY (US); Lawrence Manning, Morristown, TN (US)

(73) Assignee: Palantir Technologies Inc., Denver, CO (US)

(*) Notice: Subject to any disclaimer, the term of this patent is extended or adjusted under 35 U.S.C. 154(b) by 0 days.

(21) Appl. No.: 17/443,219

(22) Filed: Jul. 22, 2021

(65) Prior Publication Data
US 2022/0058194 A1 Feb. 24, 2022

Related U.S. Application Data

(60) Provisional application No. 63/067,576, filed on Aug. 19, 2020.

(51) Int. Cl.
G06F 16/2453 (2019.01)
G06F 16/248 (2019.01)
(52) U.S. Cl.
CPC ...... G06F 16/24537 (2019.01); G06F 16/248 (2019.01)
(58) Field of Classification Search
CPC .............. G06F 16/24537; G06F 16/248
USPC ........................................ 707/714
See application file for complete search history.

(56) References Cited

U.S. PATENT DOCUMENTS

| 7,657,576 | B1 | | 2/2010 | Norcott | |
| 10,929,415 | B1* | | 2/2021 | Shcherbakov | G06F 3/04842 |
| 11,216,511 | B1* | | 1/2022 | Bigdelu | G06F 16/248 |
| 11,263,268 | B1* | | 3/2022 | Bourbie | G06F 16/2228 |
| 11,269,871 | B1* | | 3/2022 | Bigdelu | G06F 16/2428 |
| 11,275,733 | B1* | | 3/2022 | Batsakis | G06F 16/24539 |

(Continued)

FOREIGN PATENT DOCUMENTS

EP 3958143 2/2022

OTHER PUBLICATIONS

Official Communication for European Patent Application No. 21192126.7 dated Jan. 17, 2022, 9 pages.

(Continued)

*Primary Examiner* — Dung K Chau
(74) *Attorney, Agent, or Firm* — Knobbe, Martens, Olson & bear, LLP

(57) ABSTRACT

A database system comprised of a decoupled compute layer and storage layer is implemented to store, build, and maintain a canonical dataset, a temporary buffer, and an edits dataset. The canonical dataset is a set of batch updated data. The data is appended in chunks to the canonical dataset such that the canonical dataset becomes a historical dataset over time. The buffer is a write ahead log that contains the most recent chunks of data and provides atomicity and durability for the database system. The edits dataset is the set of data that contains edits such as cell mutations, row appends and/or row deletions. The database system enables users to make cell or row-level edits to tables and observe those edits in analytical systems or downstream builds with minimal latency.

20 Claims, 10 Drawing Sheets

(56) References Cited

U.S. PATENT DOCUMENTS

| | | |
|---|---|---|
| 11,327,992 B1 * | 5/2022 | Batsakis ............... H04L 63/083 |
| 11,334,543 B1 * | 5/2022 | Anwar .................. G06F 16/254 |
| 2002/0128996 A1 | 9/2002 | Reed |
| 2019/0303470 A1 | 10/2019 | Lee et al. |

OTHER PUBLICATIONS

Chairunnanda et al., "ConfluxDB: Multi-Master Replication for Partitioned Snapshot Isolation Databases", Proceedings of the VLDB Endowment, vol. 7, No. 11, Jul. 1, 2014, pp. 947-958.

* cited by examiner

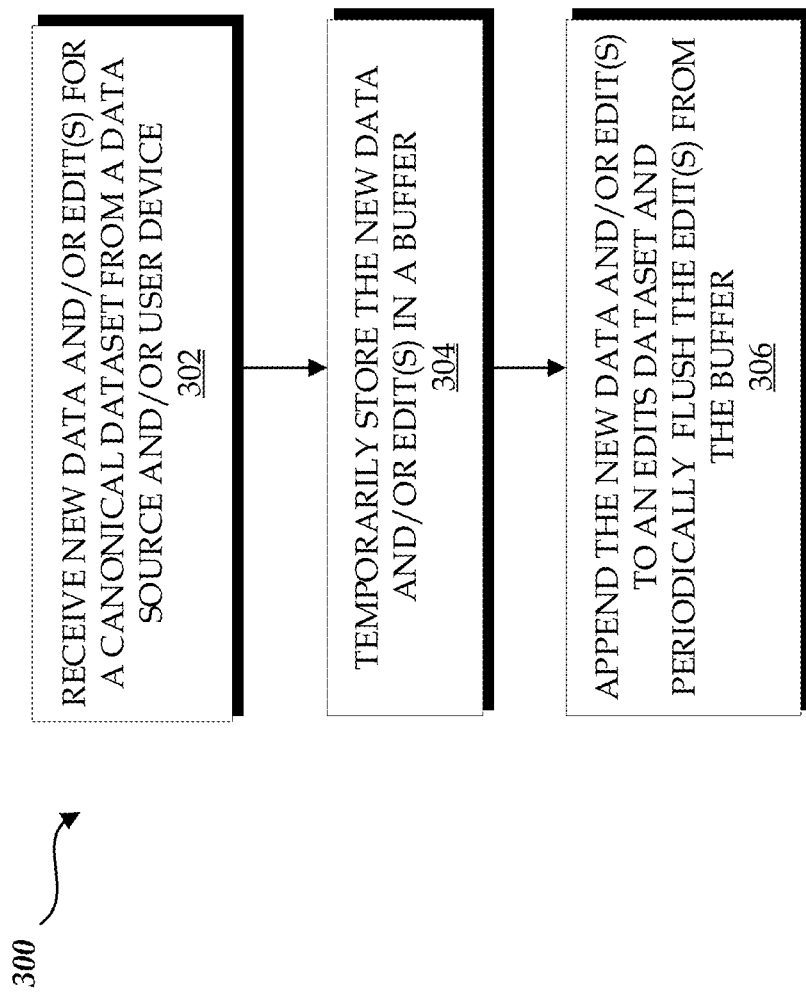

LOW-LATENCY DATABASE SYSTEM

CROSS-REFERENCE TO RELATED APPLICATIONS

This application claims a priority benefit under 35 U.S.C. § 119 to U.S. Provisional Patent Application No. 63/067,576, filed on Aug. 19, 2020, and titled "LOW-LATENCY DATABASE SYSTEM," the disclosure of which is hereby incorporated by reference herein in its entirety.

TECHNICAL FIELD

The present disclosure relates to systems and techniques for data integration, analysis, and visualization. More specifically, low-latency editing of big database systems.

BACKGROUND

A database system may store large quantities of data. For example, a database system may store on the scale of petabytes to exabytes worth of data. However, such big database systems often require specialized architecture, management, processing, and/or maintenance methodologies in order to maintain the big database system, and there may be tradeoffs between different approaches.

For example, some existing database systems, such as Online Analytical Processing (OLAP) database systems, are designed for applying complex queries to large amounts of historical data, for data mining, analytics, and business intelligence and reporting projects. These OLAP database systems may rely on a multidimensional data model to allow for complex analytical and ad hoc queries with a rapid execution time by multiple simultaneous users or perspectives. However, this emphasis on response time to complex queries means that these OLAP database systems may not be able to provide the same level of performance with regards to rapidly writing to and updating datasets.

In contrast, other existing database systems, such as Online Transactional Processing (OLTP) database systems, are designed for quickly processing a large volume of transactions that may comprise many different kinds of instructions (e.g., read, insert, update, and delete). In particular, databases configured for OLTP may be written to and updated frequently with low latency and high data integrity. Accordingly, OLTP database systems are not designed specifically to rapidly execute complex queries and instead prioritize the rapid updating of datasets. Due to these tradeoffs between query performance and write performance, a decision usually has to be made between low latency complex querying or low latency editing.

SUMMARY

The systems, methods, and devices described herein each have several aspects, no single one of which is solely responsible for its desirable attributes. Without limiting the scope of this disclosure, several non-limiting features will now be discussed briefly.

Designing and creating a database system that provides both low latency complex querying and low latency editing is a difficult task, especially when large amounts of data (e.g., petabytes, exabytes etc.) must be stored and queried, or when streaming data is involved. Furthermore, the use of versioned datasets for reducing the latency of complex querying (e.g., by storing multiple data copies) can greatly add to the complexity of the system and will often result in a tremendous increase in the amount of data being stored, more datasets that need to be updated, and additional processing needed to update the datasets. Thus, there exists a need for low latency editing to big database systems, such as OLAP oriented database systems, where the low latency editing bridges toward rapid update database systems, such as OLTP database systems.

Described herein is a database system that may serve as a general data store that is capable of handling datasets or collections of data that are of varying sizes (e.g., from a hundred bytes to terabytes and larger) and formats (e.g., bytes for a table). The components of this database system cooperate and work together in a manner that enables both low-latency edits and low-latency reads for large scale OLAP-oriented database systems, thereby bridging the divide between OLAP and OLTP database systems.

More specifically, the database system may be comprised of a decoupled compute layer and storage layer, and it is implemented to store, build, and maintain a canonical dataset, a durable temporary buffer, and an edits dataset. The canonical dataset may contain historical data collected up to a particular point in time (e.g., a historical state). In some embodiments, the canonical dataset may be created from a set of batch updated data, and the data can be appended in chunks to the canonical dataset such that the canonical dataset becomes a historical dataset over time. The buffer is a write-ahead log that contains the most-recent edits (e.g., cell mutations, row appends and/or row deletions) to the data in the canonical dataset, and it provides atomicity and durability for the database system. It is faster to write data to the buffer than it is to read from it; for optimal performance it is important that the buffer is prevented from becoming too large. Thus, when certain conditions are met (e.g., size and/or time), the buffer is dumped to an edits dataset by appending the contents of the buffer to the edits dataset and then flushing the buffer. The edits dataset, which is better for reading large quantities of data but has slower performance for updates, serves as a growing collection of all the edits that have been dumped from the buffer over time.

Thus, the canonical dataset provides a snapshot or state of the data at a particular point in time, and the combined contents of the edits dataset and the buffer collectively serve as a running log of all the edits that have been made to the data since that point in time. When the database system receives a query, the database system can perform on-the-fly construction of a read time synthesized view of the canonical dataset with all the appropriate edits applied to it. This synthesized view reflects the "current" or "latest" view of the data. In order to perform this this read time resolution, the database system may have a query rewriter that adapts and rewrites the query to properly and efficiently join together the contents of the canonical dataset, edits dataset, and/or the buffer as a means of achieving low latency observability. In some embodiments, there may be resolution logic or policies that can be applied during this read time resolution in order to selectively apply edits from the edits dataset or the buffer, and to integrate/resolve any conflicting data between the canonical dataset, edits dataset, and/or the buffer.

In some embodiments, the database system may additionally generate formatted and collapsed versions of the edits dataset and/or canonical dataset, which correspond to the particular points in time that those versions were generated. The edits dataset and/or canonical dataset can be collapsed in advance of a query being received and processed. When a query is received, the query rewriter may rewrite the query to read data from the collapsed edits dataset and/or canonical dataset in lieu of the initial edits dataset and/or canonical dataset in order to optimize and improve performance of the read time resolution of the synthesized view.

The practical outcome of this database system is that it can be implemented with any OLAP query system having pluggable data sources and pluggable query rewriters to provide low latency atomic updates to stored data (e.g., a change to an individual data value) that are quickly implemented (e.g., within seconds or sub-second) and also low latency reads from that data. For example, the database system enables users to make cell or row-level edits to tables and observe those edits in analytical systems or downstream builds with minimal latency. A user working with the dataset can make edits to the data and then see those edits being reflected in the data in real-time. As a specific example, a user could issue an edit to data of a dataset displayed in a user interface and the edit could be immediately implemented by the database system by writing it to the buffer. Once the edit has been implemented, the user's display of the dataset (or any other user's display of the dataset) can be quickly updated to reflect the edited data by re-running the query on the dataset and having the query rewriter read and merge the contents of the canonical dataset, edits dataset, and buffer (which contains that edit).

Accordingly, in various embodiments, large amounts of data are automatically and dynamically generated or calculated in response to user inputs and interactions, and the generated or calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 3A is an example flow chart for updating the canonical dataset, buffer, and edits datasets.

DETAILED DESCRIPTION

Overview

Figure 1:
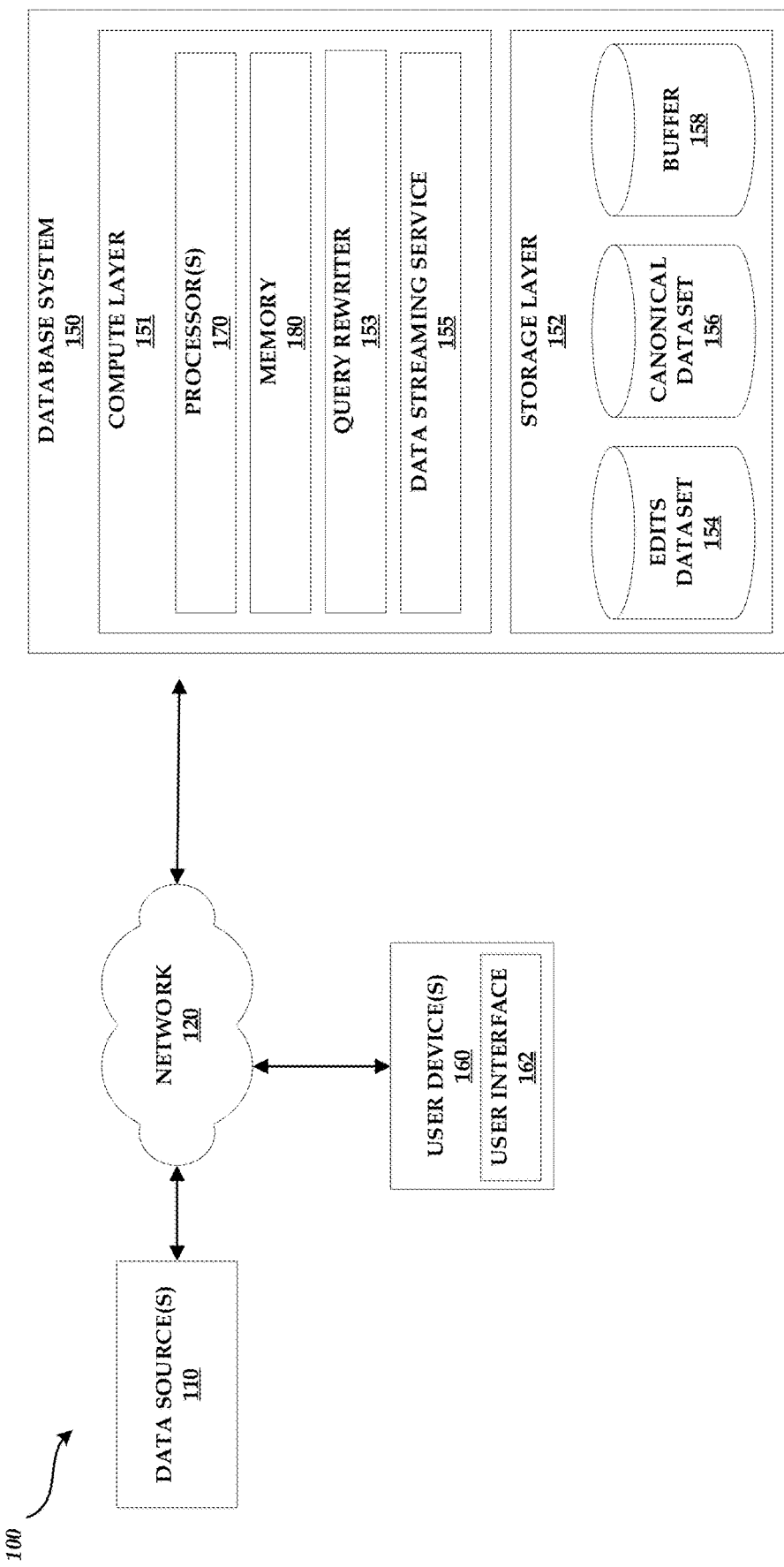
FIG. 1 is a block diagram illustrating a database system environment.

Online Analytical Processing (OLAP) database systems can be used to store, query, and process large quantities of immutable, versioned datasets. OLAP database systems typically provide faster querying at the expense of editing, which is usually performed through bulky or batch updates of datasets (e.g., in which hundreds of thousands of rows or data items may be updated at a time). However, it may be desirable to allow the data to be quickly changed and updated in short atomic transactions, which is a feature typically associated with Online Transactional Processing (OLTP) database systems.

Described herein is a database system that addresses this issue through the use of particular components that cooperate and work together in a manner that enables low-latency atomic edits and low-latency reads for large scale OLAP-oriented database systems, thereby bridging this divide between OLAP and OLTP database systems. In particular, the database system enables the edit flow typical of OLTP database systems and allows a single row or data item at a time to be instantly updated (e.g., within seconds or sub-second, not hours). This database system may serve as a general data store that is capable of handling datasets or collections of data that are of varying sizes (e.g., from a hundred bytes to terabytes and larger) and formats (e.g., bytes for a table). Although data of any format can be stored, most of the examples herein are described using tabular data in order to better facilitate understanding of how the database system operates.

The database system may include: (1) a canonical dataset, which may be immutable (e.g., does not frequently change) and contains historical data without any user edits applied to it; (2) a durable buffer, which serves as a temporary write-ahead log that all user-provided edits are initially written to; (3) an "edits" dataset, which is a cumulative collection of all the edits that have been flushed from the buffer as it is cleared from time to time; and (4) a query rewriter. In some embodiments, the database system may be a decoupled database system and its components may be distributed across separate compute layer and storage layers in order to better save and manage the resources of the database system.

In some embodiments, the canonical dataset may contain historical data collected up to a particular point in time (e.g., a historical state). The canonical dataset may be imported into the database system (e.g., from one or more external sources during an initialization phase) or it can be generated over time. For instance, the canonical dataset may be a bulky and batch updated dataset (e.g., created from a set of batch updated data) and data can be appended in chunks to the canonical dataset in order to build a historical record over time.

A user may wish to make updates and edits (also referred to as transactions) to a dataset—more specifically, the "current" state of the data of a canonical dataset. In some embodiments, the canonical dataset may contain tabular data (e.g., data for a table having numerous individual cells that are arranged into rows and columns). Thus, an edit can range from minor changes (e.g., change a cell value or add a new row of data to the table) to comprehensive changes (e.g., delete an entire table or replace it with another table). Some of the more common edits may include cell mutations, row appends, row deletions, and/or column deletions, etc.

In some embodiments, the user may be able to make edits to a dataset—more specifically, the "current" state of the data of a canonical dataset—as it is displayed within a user interface. In the case that there have been no previous edits made to the canonical dataset (e.g., the canonical dataset was recently initialized), the user interface may present the canonical dataset and its actual cell values as an editable table. As the user is making edits to the displayed data, individual edits can be pushed to the database system as atomic updates to implement and save. In some embodiments, the database system may adhere to protocols for atomic updating, such that a user working on making revisions to a dataset can specifically choose when to deploy or push those edits to the dataset as an update (e.g., have the database system implement the edits).

In some embodiments, when a user-provided edit to a dataset is deployed, the database system writes the edit with a timestamp to the durable buffer. Thus, as edits for the dataset are received they are added to the buffer in chronological order. In some embodiments, the buffer may keep track of edits using a key-to-value format. More specifically, an edit may have the format of a key (e.g., the row in the dataset corresponding to the edit) and value (the specific overwrite to perform) pair. Value can be a complex type and there may be different flags for different operations, such as a flag to effectively delete the row corresponding to the key. Additionally, value could take the format of {[column set], [value set]} to instead allow for edits or updates to multiple columns in the row. Column updates could be deletions as well.

The buffer may generally only contain the most-recent edits made to the dataset because the buffer may not be infinitely scalable, as it is really only good at fast writes and not fast reads. For optimal query performance, it is important that the buffer is prevented from becoming too large since it will be slow during queries. This buffer performance issue can be solved by flushing or dumping the buffer (e.g., transferring the contents of the buffer) to an edits dataset, which is a better long-term storage location compared to the buffer. Flushing or dumping the buffer to the edits dataset may entail appending the contents of the buffer (e.g., the instantiated read state of the buffer) to the edits dataset and then deleting the contents of the buffer, and this may be performed whenever certain conditions are met (e.g., a size threshold and/or time threshold).

For example, in some embodiments, the buffer may be dumped to the edits dataset periodically (e.g., every five minutes). In other embodiments, there may be both a size threshold and a time threshold, and the buffer may be dumped to the edits dataset whenever one of those thresholds is exceeded. As a specific example, the buffer may be limited to storing five gigabytes in edits, and the buffer may be dumped to the edits dataset when that size limit is exceeded or a time period (e.g., every half hour) has elapsed.

In some embodiments, once the edits dataset has been initially created it will continually grow in size as edits from the buffer are appended to it. More specifically, flushed edits from the buffer may be added to the existing data in the edits dataset as rows in time order (e.g., based on a timestamp associated with when the edit was written to the buffer or a time applied to the edit as it is written to edits dataset). No data in the edits dataset will be deleted or overwritten, which means the edits dataset acts as a growing, long-lived, efficiently-accessible archive of edits to the dataset received by the database system (and dumped from the buffer over time). Although the edits dataset may be better than the buffer for reading large quantities of data, it may have slower performance for updates (e.g., over the duration of minutes). However, that is a complementary weakness that is resolved by the buffer. Taken together, the combined contents of the edits dataset and the buffer constitutes a single unified view of all the edits (e.g., made to the canonical dataset). Thus, the canonical dataset provides a snapshot or state of data at a particular point in time, and the combined contents of the edits dataset and the buffer collectively serve as a running log of all the edits that have been made to the data since that point in time.

When the database system receives a query, the database system can perform on-the-fly construction of a read time synthesized view of the canonical dataset with all the appropriate edits applied to it. This synthesized view reflects the "current" or "latest" view of the data. In order to do this, the database system may take the canonical dataset and join it with all the edits. However, it may take considerable time (e.g., minutes) to actually join datasets to obtain a read time synthesized view. Instead, a view time resolution across datasets can be obtained by rewriting the query to search and read from the canonical dataset, edits dataset, and buffer. In other words, the database system may rewrite the query to read from the canonical dataset, edits dataset, and buffer, as if they had been coalesced into a single dataset.

In some embodiments, the database system may have a query rewriter that adapts and rewrites the query in order to perform this read time resolution in order to properly and efficiently join together the contents of the canonical dataset, edits dataset, and/or the buffer. For example, in some embodiments, the query rewriter may join the canonical dataset with the edits dataset and apply the edits in the edits dataset in time order, and then join that output with the buffer and apply the edits in the buffer in time order. Alternatively, the buffer and edits dataset can be collapsed into a single dataset and joined with the canonical dataset. In some embodiments, there may be resolution logic or policies that can be applied during this read time resolution in order to selectively apply edits from the edits dataset or the buffer, and to integrate/resolve any conflicting data between the canonical dataset, edits dataset, and/or the buffer. This logic may be injected directly into the query to determine which values to take. In some embodiments, processing a query of a dataset may involve (1) querying the buffer and the edits dataset via the query rewriter, (2) collapsing the buffer and the edits dataset based on one or more resolution rules established from the query rewriter, (3) joining the collapsed dataset with the canonical dataset, and (4) querying the resulting joined dataset.

There may be a default resolution policy or strategy, but there may also be multiple resolution policies which are used in different circumstances. For instance, in some embodiments, a default resolution policy or strategy may be to always take and implement an edit. For example, any edit in the edits dataset and/or buffer will be implemented and seen by the user on top of the canonical dataset. However, in some embodiments, an alternative resolution policy may be used, such as a time-based resolution policy that allows comparisons of timestamps (or any other value) associated with any edits to timestamps (or any other value) associated with the corresponding data in the canonical dataset. In other words, if an edit is more recent than the corresponding data in the canonical dataset, the edit will be preferred.

Resolution logic can be completely arbitrary. Resolution can be based on values themselves rather than source. For instance, there may be overrides where some values are preferred (e.g., in an enumeration, take higher values). Resolution logic can vary depending on the type of data. Resolution logic can even vary by cell (e.g., granular resolution logic). In other words, for cell A could be resolved based on logic A, cell B could be resolved based on logic B, and so forth, while having a global resolution policy if there is no cell-level logic. Resolution logic can be based on some type of data or some indicator (not just timestamps). Resolution logic can even vary based on the permissions of the incoming user, different edit sources, different scenarios, and so forth. For example, there may be edits to a particular data item from user group A and edits to the data item from user group B, which can be selected depending on the querying user. Resolution logic can be very complex. If there are edits for scenario one and edits for scenario two, the database system may be able to provide the synthesized view for scenario one, the synthesized view for scenario two, the synthesized view for both scenario one and scenario two, and so forth. The database system may have a preference for one of those synthesized views if there is a conflict. The database system may also allow for bi-temporality or to provide a synthesized view of the data as it was at some point in time. This can easily be performed since the database system keeps track of individual edits and timestamps, whereas traditional database systems often directly modify or discard the underlying data as edits are implemented.

In some embodiments, the database system may support multiple use modes or edit modes to provide different configurations for different use cases. In some embodiments, in a first edit mode, the database system may not support batch updating and the datasets in the database system may consist only of edits, appends, and deletes. This may be particularly useful for the streaming data use case, in which the data stream will contain all the information needed for queries (e.g., no backfill). Thus, the canonical dataset will often not be needed and only the durable buffer and edits dataset will be needed in order to put in front of the user the most up to date version of the data with minimal latency (e.g., sub-second). Latency here would be measured from the instant the system knows about an edit to the moment that the user would see it reflected in a user interface or in transforms on the data. In the first edit mode, there may exist an empty canonical dataset with no build inputs. User edits may be first written to the buffer, which is periodically flushed to the edits dataset. When a user queries the canonical dataset, the query rewriter may rewrite any canonical dataset references as a full join between the edits dataset and the contents of the buffer, coalescing values under a "last write wins" resolution policy.

In some embodiments, in a second edit mode, the database system may support batch updating and edits to datasets in the database system may be normally created through the batch update mechanism. There may be a canonical dataset containing historical data, which will typically be built by the batch build system. The query rewriter may rewrite any canonical dataset references as a full join between the canonical dataset, the edits dataset, and the contents of the buffer. The query rewriter may coalesce values between the canonical dataset, the edits dataset, and the buffer under a "last write wins'" resolution policy or by leveraging a user-defined function for choosing cell values when a conflict exists between the canonical dataset, the edits dataset, and/or the buffer. This mode may be particularly useful for use cases in which there is a lower rate of streaming data (e.g., not as high throughput and on a longer time scale) that is processed and combined with historical data. The historical data can be put into a canonical dataset, which may also change over time as people fix errors in entries and can be recompiled or updated over time (without data obtained from the streaming source). This mode may also be useful for use cases in which there is no streaming data and data is generally manually changed. Data can be primarily imported and stored in the canonical dataset. Changes to data may not happen very often, but they can be written to the buffer or edits dataset to allow the changes or updates to be done with a minimal amount of latency.

The core features of the database system may provide numerous advantages. By utilizing the buffer and the mixing of multiple datasets together, this database system may be used with immutable, versioned, big-data systems while providing low latency reads since the key-value store scales only with additional edits (not total dataset scale or its longevity). It can be implemented with any OLAP query system having pluggable datasources and pluggable query rewriters to provide low latency atomic updates to stored data (e.g., a change to an individual data value) that are quickly implemented (e.g., within seconds or sub-second), so that a user working with the dataset (e.g., querying or editing the dataset) can make edits and then see those edits reflected on their screen in real-time by having the query re-run to join the data and update the user's display. This database system may work for any primary-keyed dataset. The database system may also be expanded to work for any dataset that meets a unique-row constraint and to allow for edits to be applied to any tabular dataset. For example, the database system may cover edits at the cell level where a cell may contain a struct, list, or list of structs.

As an illustration, if an edit requested by a user were to change the value of a row in a first name column from Carolina to Caroline, first the edits (e.g., cell mutations, row appends and row deletions) for Carolina to Caroline are written to the buffer Subsequently, edits from the buffer are appended to the edits dataset and the buffer is flushed. The query rewriter may (1) read from the buffer and/or the edits dataset, and (2) collapse the buffer and/or edits dataset based on resolution rules. After that, the collapsed edits dataset is joined with the canonical dataset. Then, the actual table view (e.g., new table showing Caroline as a value of a row in the first name column) may be rendered onto a user interface based on a result of a query on the joined collapsed edits dataset and canonical dataset.

In some embodiments, the database system may perform temporal versioning by collapsing the edits dataset and/or canonical dataset, which may be formatted and compacted versions of the edits dataset and/or canonical dataset that incorporate all the edits up to the particular points in time the datasets were collapsed. There may be a global resolution strategy that is applied when collapsing these datasets. This may help alleviate issues with having the original edits dataset and/or canonical dataset grow unbounded, which would result in additional time needed to incrementally add to it or requiring additional storage and resource utilization/costs.

For example, the existing edits dataset can be collapsed by following a set of rules in order to generate a formatted, condensed version of the edits dataset. In particular, the contents of the buffer and the edits dataset can be queried to obtain the most-recent edit associated with each cell or data item, which can all be combined in order to generate a collapsed form of the edits dataset. The collapsed form of the edits dataset represents a collapsed view of all the edits, and at some point this collapsed form can even become the truth (e.g., the unincorporated edits can be purged). When a query is received, the query rewriter may rewrite the query to read data from the collapsed form of the edits dataset in lieu of the initial edits dataset in order to optimize and improve performance of the read time resolution of the synthesized view.

Similarly, the database system may be able to generate a collapsed form of the canonical dataset. For example, the database system may collapse the buffer into the edits dataset by applying a set of rules and then join that collapsed edits dataset with the canonical dataset to create a collapsed form of the canonical dataset that has all the edits applied to it. When a query is received, the query rewriter may rewrite the query to read data from a collapsed form of the canonical dataset in lieu of the initial canonical dataset in order to optimize and improve performance of the read time resolution of the synthesized view.

These collapsed forms of the edits dataset and/or canonical dataset can be generated in advance of a query being received and processed. They can be maintained separately instead of the traditional technique of pushing down all edits into a singular canonical dataset (e.g., finalizing the edits periodically). In some embodiments, different versions of a dataset can continually accrue as additional collapsed forms are generated using incremental edits. Over time, outdated datasets (e.g., the initial canonical dataset once there are multiple collapsed forms) may be deleted. In some embodiments, the query rewriter may rewrite a query to read data from a combination of the original or collapsed forms of the edits dataset and/or the canonical dataset, which can be used to optimize and improve performance of the read time resolution of the synthesized view depending on the query.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically the structured set of datasets stored and accessed electronically from a computer system such as a datastore. Accordingly, each database referred to herein (e.g., in the description herein and/or the figures of the present application) is to be understood as being stored in one or more data stores.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Table: An arrangement of data in columns and rows. A collection of related data or data elements (e.g., values) can be stored across cells located where the rows and columns intersect. The collection of data elements may be stored as tabular data, which structures the data into rows, with each row containing the same number of cells (although some of these cells may be empty). A table may be used to structure data in a dataset.

Dataset: A specific collection of bytes/tabular data. The specific collection of bytes/tabular data may also include the table(s) that contain, order, and constrain the bytes/tabular data as well as the relationships between the tables.

Edits: Write operations that include additions, modifications, deletions, cell mutations, appends, insertions, among other related dataset write operations.

Transaction: A set of edits or updates to be made to a dataset that is received by the database system.

Canonical Dataset: Generally, a dataset that contains a set of "original" or "initial" data (e.g., historical data), which is usually compiled and/or updated using batch updates. In some embodiments, the joined edits dataset and buffer may be collapsed and used to update the canonical data set in batches. The canonical dataset is typically updated with the edits last. The canonical dataset may be optimal for reading large quantities of data but suboptimal for fast writes over time.

Edits dataset: Generally, a set of data that contains edits (e.g., cell mutations, row appends and/or row deletions) that are applicable to the set of data in the canonical dataset. The edits dataset may grow over time as edits are flushed from the buffer and appended to the edits dataset.

Buffer: A write ahead log for providing atomicity and durability for a database. User-requested edits are first recorded in the buffer. The edits are then periodically or intermittently appended to the edits dataset after either a certain amount of time has passed and/or a certain volume of edits has occurred and are then flushed from the buffer. The buffer is optimal for fast writes but suboptimal for reads over time.

Query rewriter: An aspect of the database system that transforms the original query to a new query which produces the same query results but executes with better performance (e.g., lower latency). The query rewriter may rewrite the original query into a new query having multiple portions that can be executed across different datasets. For example, the query rewriter may rewrite the original query into a new query that may be divided into multiple actions (e.g., based on resolution rules) that are specific for the buffer, edits dataset and/or canonical dataset.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Database System Environment

FIG. 1 illustrates an example block diagram of a database system environment 100, according to some embodiments of the present disclosure. The database system environment 100 may include components such as one or more data sources 110, one or more user devices 160, and a computing database system 150. These components may be communicatively coupled via a network 120. The network 120 can be of a conventional type, wired or wireless, and may have numerous different configurations including a star configuration, token ring configuration or other configurations. Furthermore, the network 120 may include a local area network (LAN), a wide area network (WAN) (e.g., the Internet), and/or other interconnected data paths across which multiple devices may communicate. In some implementations, the network 120 may be a peer-to-peer network. The network 120 may also be coupled to or include portions of a telecommunications network for sending data in a variety of different communication protocols. In some implementations, the network 120 includes Bluetooth communication networks or a cellular communications network for sending and receiving data including via short messaging service (SMS), multimedia messaging service (MMS), hypertext transfer protocol (HTTP), direct data connection, WAP, email, etc.

For the purposes of simplicity and facilitating understanding, some of the figures and their accompanying descriptions within this disclosure may refer to a single data source 110 or user device 160; however, it should be understood that there can be numerous data sources 110 and/or user devices 160. Furthermore, it should be understood that in the embodiments shown in FIGS. 2A-2E, the illustrated database system 150 can be similar to, overlap with, and/or be used in conjunction with the computing database system 150 of FIG. 1. For example, the database system 150 of FIG. 2A can similarly include buffer 158, edits dataset 154, and canonical dataset 156, each of which may be similar in use and/or implementation as in the database system 150 in the database system environment 100 of FIG. 1. However, the database environment 100 can also include a data streaming service 155, query rewriter 153, among other features as shown in the database system environment 100 of FIG. 1.

The one or more user devices 160 may each be capable of generating and displaying a user interface 162 to a user of the device. Through the user interface 162 of a user device 160, a user may be able to interact with, and issue instructions to, the database system 150. For example, the user may be able to view and make edits to a dataset managed by the database system 150, to send queries to the database system 150 in order to retrieve information from datasets, and so forth.

The example database system 150 may include one or more applications such as a query rewriter 153, one or more services such as a data streaming service 155, one or more initial datasets such as an edits dataset 154, a canonical dataset 156 and a buffer 158, and one or more data transformation processes as highlighted in FIGS. 2A-2E. In some embodiments, the database system 150 may be a decoupled database system 150 that includes a compute layer 151 and a storage layer 152 that are decoupled from each other in order to better save and manage resources. The compute layer 151 may handle tasks such as edit and query processing, while the storage layer 152 may manage the storage of edits and datasets. By separating the compute layer 151 and the storage layer 152, the decoupled database system may be able to independently scale up or down both the amount of data a user wants to store as well as the amount of edits and queries that can be processed. Additionally, for the decoupled database system 150, the compute layer 151 may be in a state of quiescence where if nothing is running on the stack, then no compute resources need to be allocated, and thus resources are preserved. The compute layer 151 may include one or more processor(s) 170, memory 180, a query rewriter 153, and a data streaming service 155. The storage layer 152 may include an edits dataset 154, a canonical dataset 156, and a buffer 158. In some embodiments, the buffer 158 may be a write-ahead log that provides atomicity and durability for the database system 150.

In some embodiments, the example database system 150 can include a data pipeline system. The database system 150 can transform data and record the data transformations. The one or more applications can include applications that enable users to view datasets, interact with datasets, filter data sets, and/or configure dataset transformation processes or builds. The one or more services can include services that can trigger the data transformation builds and API services for receiving and transmitting data. The applications and services can access network 120 to communicate with one or more data source(s) 110 or one or more user device(s) 160. The user device(s) 160 also includes a user interface 162 to allow the user to visually query, view, interact with, filter, and/or configure the edits dataset 154, canonical dataset 156 and buffer 158. The one or more initial datasets 154, 156 and buffer 158 can be automatically retrieved from external sources such as from data source(s) 110 and/or can be manually imported by a user such as from user device(s) 160. The one or more initial datasets 154, 156 and buffer 158 can be in many different formats such as a tabular data format (SQL, delimited, or a spreadsheet data format), a data log format (such as network logs), or time series data (such as sensor data).

In some embodiments, the database system 150, via the one or more services, can apply data transformation processes. Example data transformation processes are shown in FIGS. 2A-2E. The database system 150 can receive one or more initial datasets 154, 156 and buffer 158. The database system 150 can apply a transformation to the datasets 154, 156 and buffer 158. For example, the database system 150 can apply a first transformation to the initial edits dataset 154, which can include combining the edits dataset 154 with the buffer 158 (such as or similar to a SQL MERGE), joining the edits dataset 154 with the buffer 158 (such as or similar to a SQL JOIN), and/or a filtering of the edits dataset 154. The output of the first transformation can include a modified dataset. A second transformation of the modified dataset can result in an output dataset, such as a report, collapsed dataset, combined dataset, joined dataset, merged dataset or a joined table in a tabular data format that can be stored in the database system 150. Each of the steps in the example data transformation processes can be recorded and/or stored by the database system 150 and made available as a resource, for example to one or more user devices 160. For example, a resource can include a dataset and/or a dataset item, a transformation, or any other step in a data transformation process. As mentioned above, the data transformation process or build can be triggered by the database system 150, where example triggers can include nightly build processes, detected events, manual triggers by a user via a user device 160 or periodic batch updated data from data source(s) 110. Additional aspects of data transformations of the edits dataset 154, the canonical dataset 156, the buffer 158 and the database system 150 are described in further detail below.

The techniques for recording and transforming data in the database system 150 may include maintaining an immutable history of data recording and transformation actions such as uploading a new dataset version to the database system 150 and transforming one dataset version to another dataset version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable datasets. More specifically, a dataset may encompass an ordered set of conceptual dataset items. The dataset items may be ordered according to their version identifiers recorded in the catalog. Thus, a dataset item may correspond to a particular version of the dataset. A dataset item may represent a snapshot of the dataset at a particular version of the dataset.

As a simple example, a version identifier of '1' may be recorded in the catalog for an initial dataset item of a dataset. If data is later added to the dataset, a version identifier of '2' may be recorded in the catalog for a second dataset item that conceptually includes the data of the initial dataset item and the added data. In this example, dataset item '2' may represent the current dataset version and is ordered after dataset item '1'.

As well as being versioned, a dataset may be immutable. That is, when a new version of the dataset corresponding to a new dataset item is created for the dataset in the system, pre-existing dataset items of the dataset are not overwritten by the new dataset item. In this way, pre-existing dataset items (i.e., pre-existing versions of the dataset) are preserved when a new dataset item is added to the dataset (i.e., when a new version of the dataset is created). Note that supporting immutable datasets is not inconsistent with pruning or deleting dataset items corresponding to old dataset versions. For example, old dataset items may be deleted from the system to conserve data storage space.

A version of the dataset may correspond to a successfully committed transaction against the dataset. In these embodiments, a sequence of successfully committed transactions against the dataset corresponds to a sequence of dataset versions of the dataset (i.e., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (e.g., a new dataset item of the dataset) without deleting, removing, or modifying pre-existing dataset items (e.g., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In a preferred embodiment, the dataset version corresponds an identifier assigned to the transaction that created the dataset version. The dataset item may be associated in the catalog with the set of files that contain the data of the dataset item. In a preferred embodiment, the catalog treats the set of files as opaque. That is, the catalog itself may store paths or other identifiers of the set of files but may not otherwise open, read, or write to the files.

In sum, the catalog may store information about datasets. The information may include information identifying different versions (e.g., different dataset items) of the datasets. In association with information identifying a particular version (e.g., a particular dataset item) of a dataset, there may be information identifying one or more files that contain the data of the particular dataset version (e.g., the particular dataset item).

The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

The catalog may provide dataset provenance at the transaction level of granularity. As an example, suppose a transformation is executed in the database system 150 multiple times that reads data from dataset A, reads data from dataset B, transforms the data from dataset A and the data from dataset B in some way to produce dataset C. As mentioned, this transformation may be performed multiple times. Each transformation may be performed in the context of a transaction. For example, the transformation may be performed daily after datasets and B are updated daily in the context of transactions. The result being multiple versions of dataset A, multiple versions of dataset B, and multiple versions of dataset C as a result of multiple executions of the transformation. The catalog may contain sufficient information to trace the provenance of any version of dataset C to the versions of datasets A and B from which the version of dataset C is derived. In addition, the catalog may contain sufficient information the trace the provenance of those versions of datasets A and B to the earlier versions of datasets A and B from which those versions of datasets A and B were derived.

The provenance tracking ability is the result of recording in the catalog for a transaction that creates a new dataset version, the transaction or transactions that the given transaction depends on (e.g., is derived from). The information recorded in the catalog may include an identifier of each dependent transaction and a branch name of the dataset that the dependent transaction was committed against.

According to some embodiments, provenance tracking extends beyond transaction level granularity to column level granularity. For example, suppose a dataset version A is structured as a table of two columns and a dataset version B is structured as a table of five columns. Further assume, column three of dataset version B is computed from column one of dataset version A. In this case, the catalog may store information reflecting the dependency of column three of dataset version B on column one of dataset version A.

The catalog may also support the notion of permission transitivity. For example, suppose the catalog records information for two transactions executed against a dataset referred to in this example as "Transaction 1" and Transaction 2." Further suppose a third transaction is performed against the dataset which is referred to in this example as "Transaction 3." Transaction 3 may use data created by Transaction 1 and data created by Transaction 2 to create the dataset item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column level. In this case, permission may be revoked (or granted) on a particular column of a dataset and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset(s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The database system 150 can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data pipeline. To support branching, the catalog may store information represents a graph of dependencies as opposed to a linear dependency sequence.

The database system 150 may enable other data transformation systems to perform transformations. For example, suppose the system stores two "raw" datasets R1 and R2 that are both updated daily (e.g., with daily web log data for two web services). Each update creates a new version of the dataset and corresponds to a different transaction. The datasets are deemed raw in the sense that transformation code may not be executed by the database system 150 to produce the datasets. Further suppose there is a transformation A that computes a join between datasets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any.

As an example, if the build service receives a push build command with dataset R1 as the target, then the build service would determine all downstream datasets that are not up-to-date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

Database System Environment Example

FIGS. 2A-2E illustrate examples of the database system environment to provide a framework of the specific systems, components, and methods described herein. Their descriptions are provided for exemplary purposes and are not intended to limit the techniques to the example database system, the example datasets, the example data chunks or the example data. Furthermore, it should be noted that the buffer 158, canonical dataset 156, and edits dataset 154 in FIGS. 2A-2E are represented as tabular data, however this is for the purpose of facilitating understanding and is not meant to be limiting; data contained in the buffer 158, canonical dataset 156, and edits dataset 154 may be represented in other non-tabular ways (e.g., tuple store, multivalue, or objectlink).

Figure 2A:
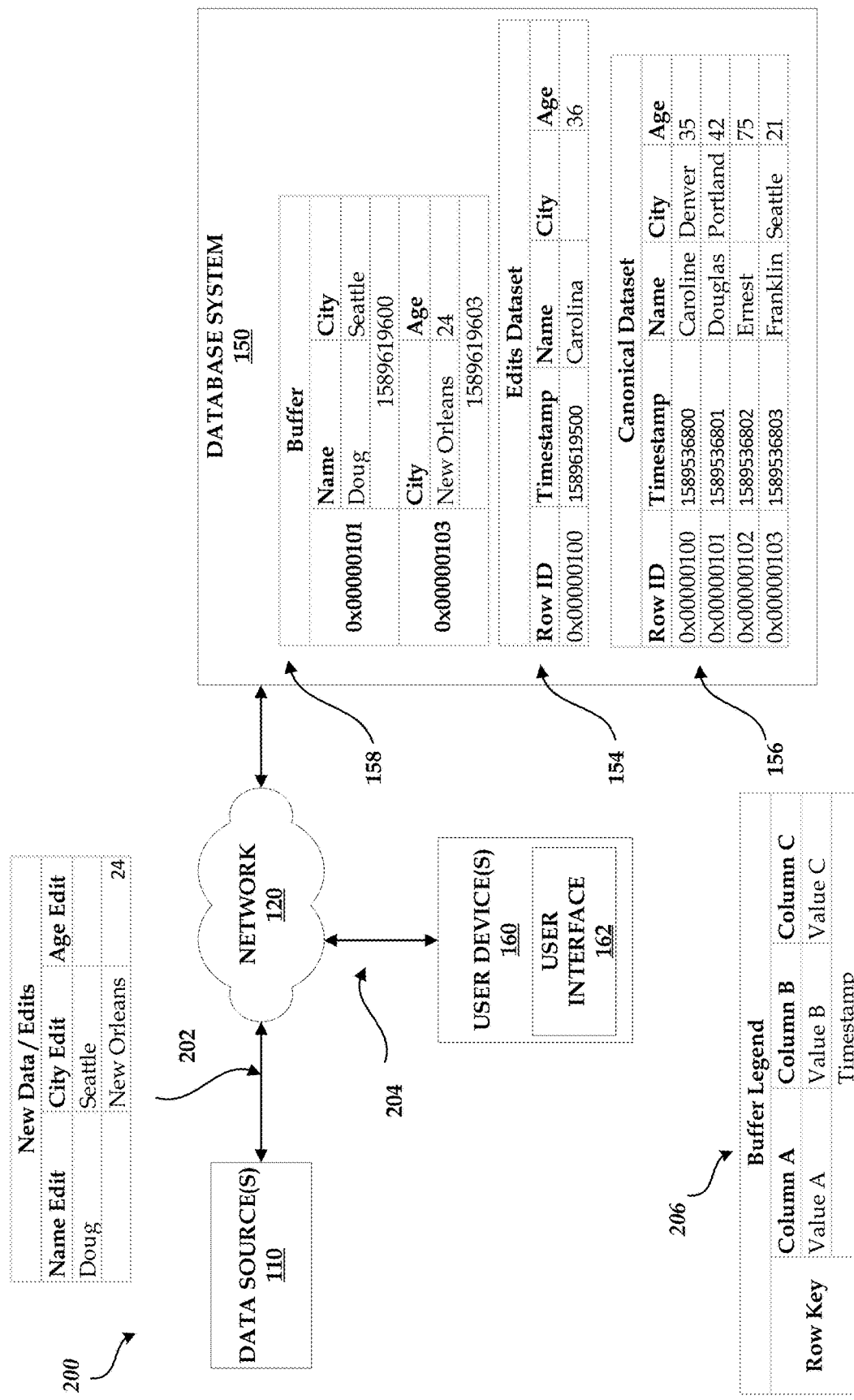
FIG. 2A is a block diagram illustrating an example of the database system environment, according to some embodiments of the present disclosure.

FIG. 2A illustrates an example database system environment 200. In the example database system environment 200, data chunks may be batch updated. For example, data chunks may be provided by data source(s) 110 and/or user device(s) 160 to the database system 150 over a network 120. The database system 150 may receive these data chunks, such as via the data streaming service 155 (shown in FIG. 1). The data chunks may be defined by one or more object types, each of which may be associated with one or more property types. At the highest level of abstraction, each data chunk contains at least one data object, where the data object is a container for information representing things in the world. For example, a data object can represent an entity such as a person, a place, an organization, a market instrument, or other noun. A data object can also represent an event that happens at a point in time or for a duration. Additionally a data object can represent a document or other unstructured data source such as an e-mail message, a news report, or a written paper or article. Each data object is associated with a unique identifier that uniquely identifies the data object within the database system 150.

Different types of data objects may have different property types. For example, a "Person" data object might have an "Eye Color" property type and an "Event" data object might have a "Date" property type. Each property as represented by data in the database system 150 may have a property type.

Objects may be instantiated in the database system 150 in accordance with the corresponding object definition for the particular object. For example, a specific monetary payment (e.g., an object of type "event") of US $30.00 (e.g., a property of type "currency") taking place on Mar. 27, 2009 (e.g., a property of type "date") may be stored in the database system 150 as an event object with associated currency and date properties. The data objects may support property multiplicity. In particular, a data object may be allowed to have more than one property of the same property type. For example, a "Person" data object might have multiple "Address" properties or multiple "Name" properties.

The canonical dataset 156 is a set of batch updated data that makes up the main, underlying, full dataset. In the example database system environment 200, the canonical dataset 156 stores historical data containing four rows of data (e.g., row 1: 0x00000100, 1589536800, Caroline, Denver; 35, 5/15/2020) with five columns (e.g., Row ID, Timestamp, Name, City, and Age).

The buffer 158 may record specific collections of incoming data chunks comprising new data and/or edits applicable to the data contained in the canonical dataset 156, and the buffer 158 may initially store each incoming data chunk before the contents of the buffer 158 are flushed and added to the edits dataset 154. In the illustrated example of the database system environment 200, the buffer 158 stores the data chunk containing two rows of data (e.g., row 1: Doug, Seattle, null; row 2: null, New Orleans, 24) with three columns (e.g., name edit, city edit, and age edit). The buffer 158 is a columnar store buffer in which there is a row key, column, value, and timestamp for each row. The breakdown of each element in the structure of the buffer 158 is further illustrated via the sample buffer legend 206.

The edits dataset 154 is the set of data that contains edits (e.g., cell mutations, row appends and/or row deletions) of the canonical dataset 156 and/or the buffer 158. The edits dataset may be partial, in that, the edits dataset does not have to include all of the original columns from the canonical dataset 156 and/or the buffer 158. In the example database system environment 200, the edits dataset 154 contains an edit of the canonical dataset 156 that is received at a later timestamp than the original data and is an edit to the first row of data of the canonical dataset data via a name edit and age edit (e.g., row 1: 0x00000100, 1589619500, Carolina, null, 36).

In FIGS. 2B-2E various transformation methods of the buffer 158, edits dataset 154, and canonical dataset 156 are shown. Such methods include combining, merging, collapsing, and joining of the contents of the buffer 158, edits dataset 154, and/or canonical dataset 156.

Figure 2B:
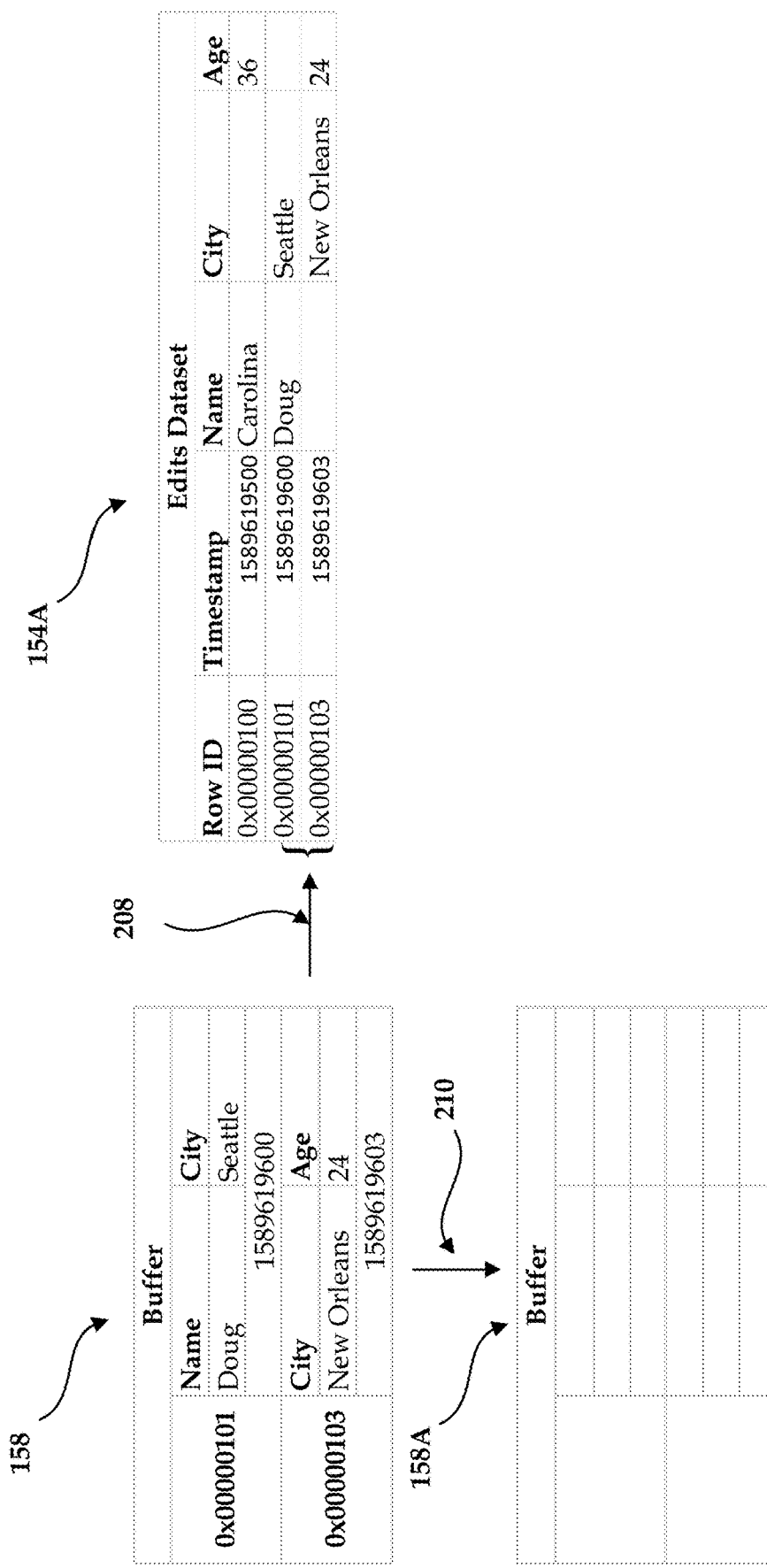
FIG. 2B is a flow diagram illustrating an example combine and flush workflow of the edits dataset and the buffer of the database system, according to some embodiments of the present disclosure.

Referring now to FIG. 2B, a flow diagram is shown that illustrates an example combine and flush workflow between the edits dataset 154 and the buffer 158 of the database system 150. In some embodiments, this particular workflow may be performed once certain conditions are met, such as if enough time has elapsed (e.g., a time threshold) and/or if the contents of the buffer 158 exceed a certain size (e.g., a size threshold). For example, there could be a five gigabyte size threshold and a thirty minute time threshold, and this workflow may be performed whenever one of those thresholds is exceeded. In the workflow, at step 208, the contents of the buffer 158 are first appended to the end of the edits dataset 154A. Then the buffer 158 may be periodically flushed 210, resulting in an empty buffer 158A. However, the empty buffer 158A shown is not meant to be limiting, and depending on the implementation, partial flushing of the buffer 158 may also occur.

Figure 2C:
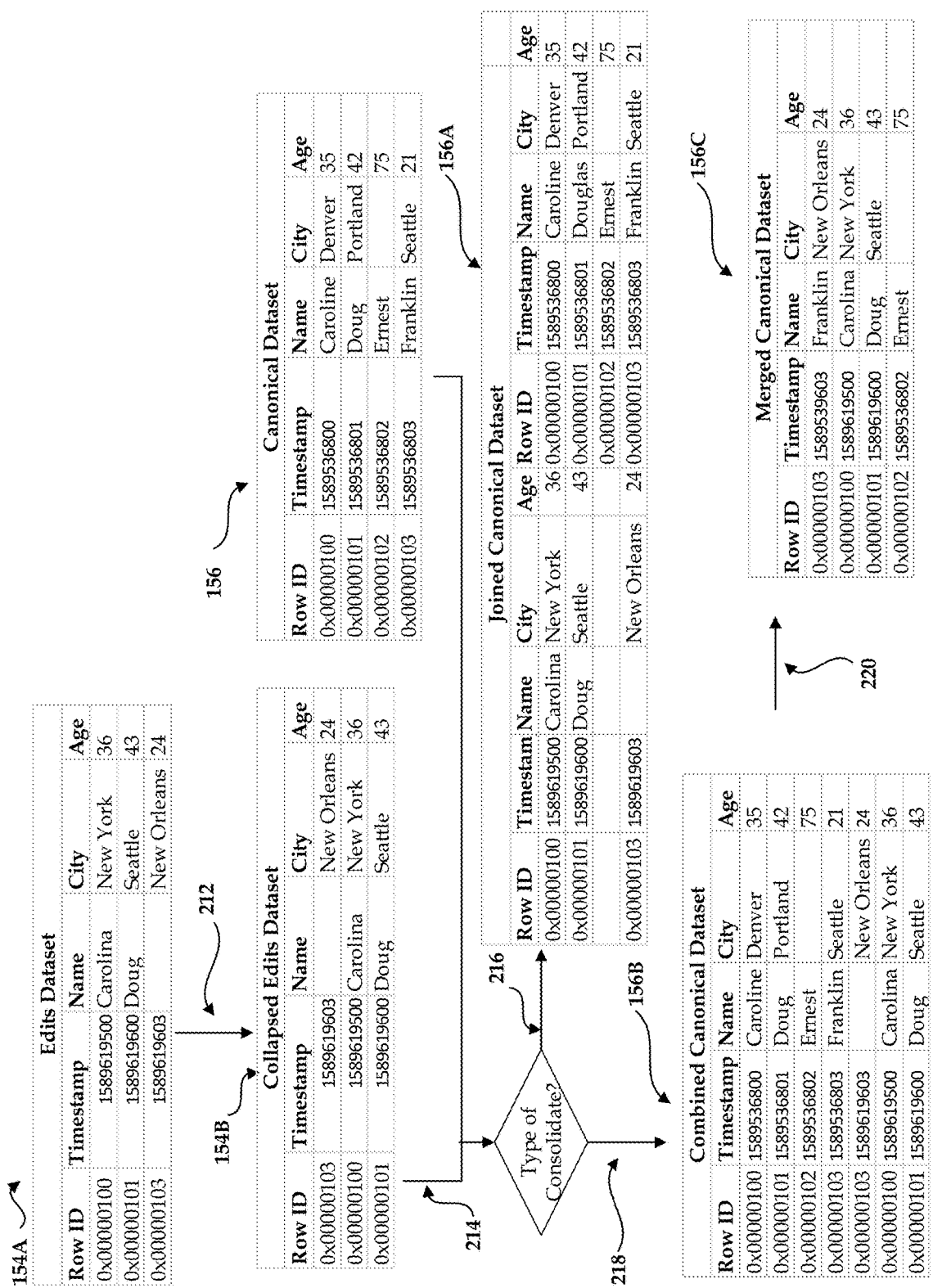
FIG. 2C is a flow diagram illustrating an example collapse and consolidate workflow of the edits dataset and the canonical dataset of the database system, according to some embodiments of the present disclosure.

FIG. 2C is a flow diagram illustrating an example collapse and consolidate workflow that is applicable to the edits dataset 154A and the canonical dataset 156 of the database system 150. In FIG. 2C, the same edits dataset 154A of FIG. 2B is shown in order to illustrate the collapse and consolidate workflow. This collapse and consolidate workflow can be used to generate a collapsed form of the edits dataset 154A, which can be used by the database system 150 to optimize and improve performance associated with query processing (e.g., the read time resolution of the synthesized view of the dataset). In the workflow, at step 212, the edits dataset 154A may first be collapsed based on one or more selected columns. For example, the collapsed edits dataset 154B may contain the rows from the edits dataset 154A that are sorted based on the "age" column. In practice however, the collapsed edits dataset 154B may contain only a subset of the data in the edits dataset 154 (e.g., a subset of rows and/or columns). At step 214, the collapsed edits dataset 154B may be consolidated with the canonical dataset 156 based on resolution rules from the query rewriter 153. For instance, at step 216, the collapsed edits dataset 154B may be joined (e.g., left join based on row ID) with the canonical dataset 156 in order to form a joined canonical dataset 156A. Or, at step 218, the collapsed edits dataset 154B may be combined with the canonical dataset 156 in order form a combined canonical dataset 156B. At step 220, the database system may take the combined canonical dataset 156 and apply the more-recent edits taken from the collapsed edits dataset 154B to the data originating from the canonical dataset 156. For instance, the database system may go through the edits obtained from the collapsed edits dataset 154B in chronological order (e.g., based on timestamp), determine the row ID associated with each edit, and then apply that edit to the corresponding row of data taken from the canonical dataset 156 (e.g., with a matching row ID). The result can be the merged canonical dataset 156C, which can be in a sorted order depending on need. In the figure, the merged canonical dataset 156C is shown sorted by age, from youngest to oldest).

Figure 2D:
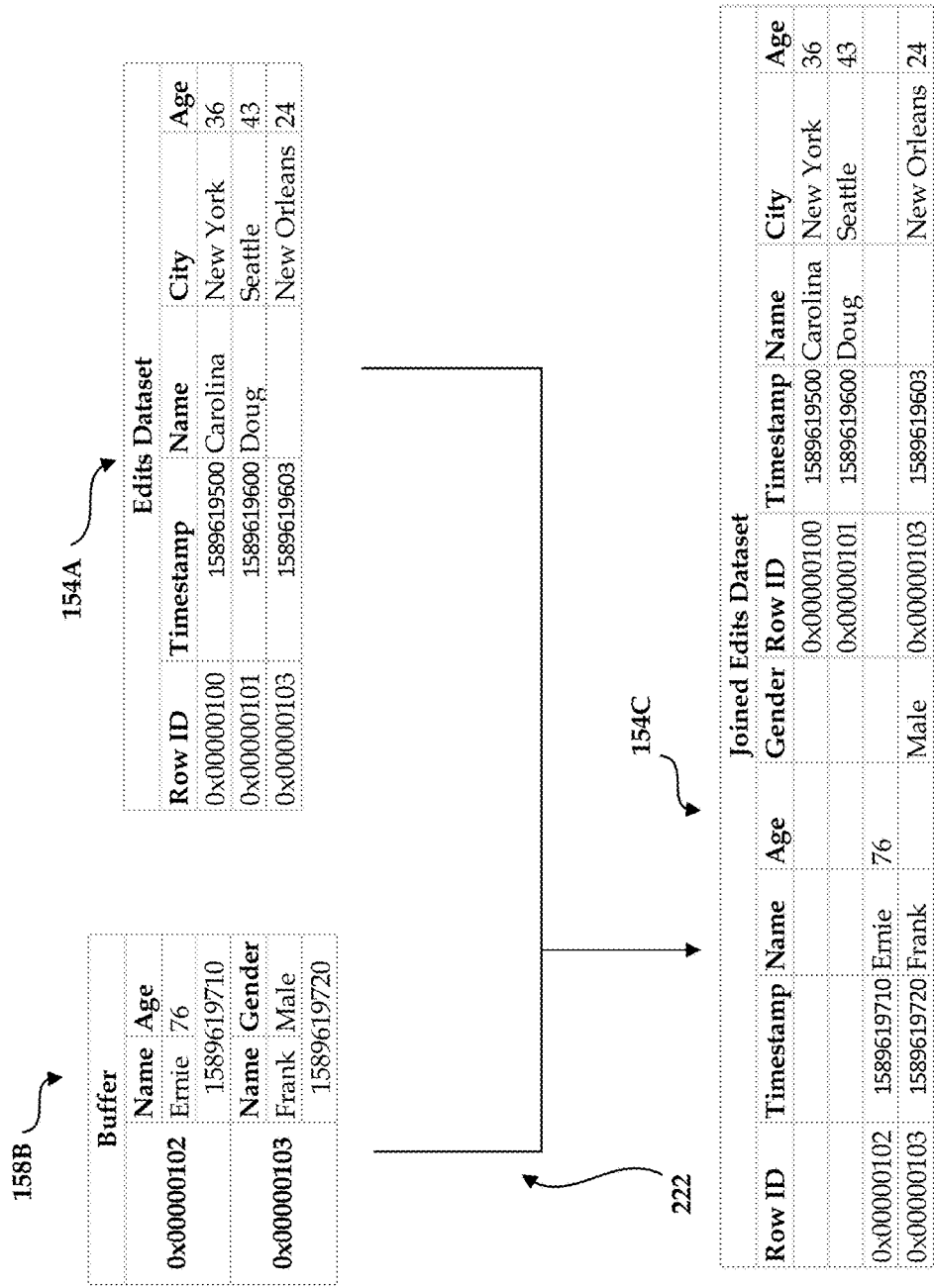
FIG. 2D is a flow diagram illustrating an example join workflow of the edits datasets and the buffer of the database system, according to some embodiments of the present disclosure.

FIG. 2D is a flow diagram illustrating an example join workflow that is applicable to the edits datasets 154A and the buffer 158B of the database system 150. In this example join workflow, at step 222, the edits dataset 154A from FIG. 2B is joined (e.g., left join based on row ID) with new updated buffer 158B to form a joined edits dataset 154C. Afterwards, the joined edits dataset 154C may additionally be transformed such as being combined, collapsed, joined, or merged (among other operations) based on the resolution rules of the query rewriter 153.

Figure 2E:
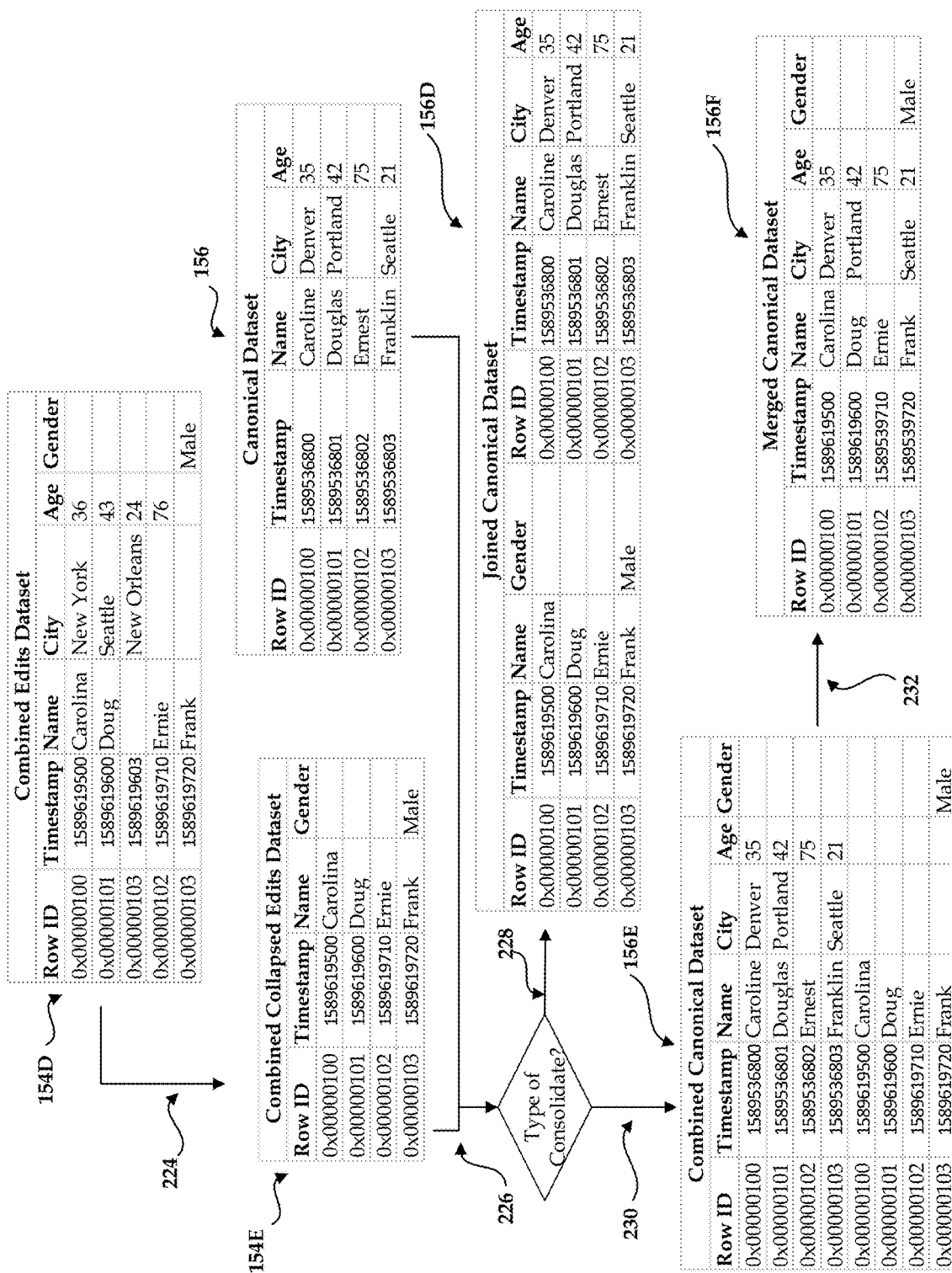
FIG. 2E is a flow diagram illustrating an example collapse and consolidate workflow of the combined edits dataset and the canonical dataset of the database system, according to some embodiments of the present disclosure.

FIG. 2E is a flow diagram illustrating an example collapse and consolidate workflow applicable to a combined edits dataset 154D and the canonical dataset 156 of the database system 150. For the purpose of illustrating the collapse and consolidate workflow, the combined edits dataset 154D may represent the combination of buffer 158B and edits dataset 154A from FIG. 2D if a combine had occurred (e.g., step 218 from FIG. 2C) instead of a join at step 222. At step 224, the combined edits dataset 154D may first be collapsed based on one or more selected columns. For example, as shown in the figure, the combined edits dataset 154D is collapsed by removing the "age" and "city" column, which results in a combined collapsed edits dataset 154E. At step 226, the combined collapsed edits dataset 154E may be consolidated with the canonical dataset 156 based on resolution rules from the query rewriter 153. For instance, at step 228, the combined collapsed edits dataset 154E may be joined (e.g., left join based on row ID) with the canonical dataset 156, forming the joined canonical dataset 156D. Or, at step 230, the combined collapsed edits dataset 154E may be combined with the canonical dataset 156, such as by appending the rows of the combined collapsed edits dataset 154E to the end of the canonical dataset 156, to form the combined canonical dataset 156E. At step 232, the database system may take the combined canonical dataset 156E and apply the more-recent edits taken from the combined collapsed edits dataset 154E to the data originating from the canonical dataset 156. For instance, the database system may go through the edits obtained from the combined collapsed edits dataset 154E in chronological order (e.g., based on timestamp), determine the row ID associated with each edit, and then apply that edit to the corresponding row of data taken from the canonical dataset 156 (e.g., with a matching row ID). The result can be the merged canonical dataset 156F, which can be in a sorted order depending on need. For example, in the figure, the merged canonical dataset 156F may be a result from being sorted by name in alphabetical order.

Although FIGS. 2B-2E display particular workflow transformation operation ordering with specific dataset examples, this is not intended to be limiting. Other combinations and ordering of such transformation operation such as combining, joining, flushing, merging, collapsing among other operations may be performed on the canonical dataset 156, edits dataset 154 and the buffer 158.

Database System Environment Flow Example

FIG. 3A is an example flow chart 300 for updating the canonical dataset 156, buffer 158, and edits dataset 154.

At block 302, the database system 150 receives one or more data chunks from a data source 110 and/or user device 160 over network 120 via data streaming service 155. The data chunks may comprise new data and/or edits for the canonical dataset 156. For example, the data chunks may contain user-provided edits to be applied to the canonical dataset 156.

At block 304, the database system 150 temporarily stores the new data and/or edits from the one or more data chunks in a buffer 158. In some embodiments, the database system 150 may add a timestamp to each new data item or edit as it is written to the buffer 158 and the contents of the buffer 158 may be arranged in time order.

At block 306, the instantiated read state or contents of the buffer 158 (e.g., the one or more data chunks) are appended to the edits dataset 154 and the data chunks are flushed from the buffer 158. The edits dataset 154 serves as a better long-term storage location compared to the buffer 158. This step may be performed periodically when a time threshold is exceeded or it may be performed whenever the buffer 158 reaches a certain size threshold. For example, in some embodiments, block 306 may be performed every five minutes and the edits dataset 154 will grow in size over time.

As a very specific example implementation of the blocks in the flow chart 300, in some embodiments, the database system 150 may be configured to be used with streaming data that contains all the information needed for queries. Thus, there would not be a need to backfill the canonical dataset with historical data and only the durable buffer 158 and the edits dataset 154 would be needed to provide a user with the most up-to-date version of the data. New data from the data stream would be received at block 302 and then written to the buffer 158 at block 304. At the same time, at block 302, any user edits to existing data can also be received as they are provided by the user, and the edits can be written to the buffer 158 at block 304. From time to time, block 306 may be performed and the contents of the buffer 158 may be appended to the edits dataset 154 and flushed from the buffer 158 in order to clear the buffer 158 and prevent it from becoming unwieldy to read from. Thus, the combined contents of the buffer 158 and the edits dataset 154 will encapsulate all the streaming data and edits that have been received by the database system 150. If a user wishes to query all of that data, the query rewriter may rewrite the query to perform a full join between the edits dataset 154 and the buffer 158 based on a "last write wins" resolution policy.

Figure 3B:
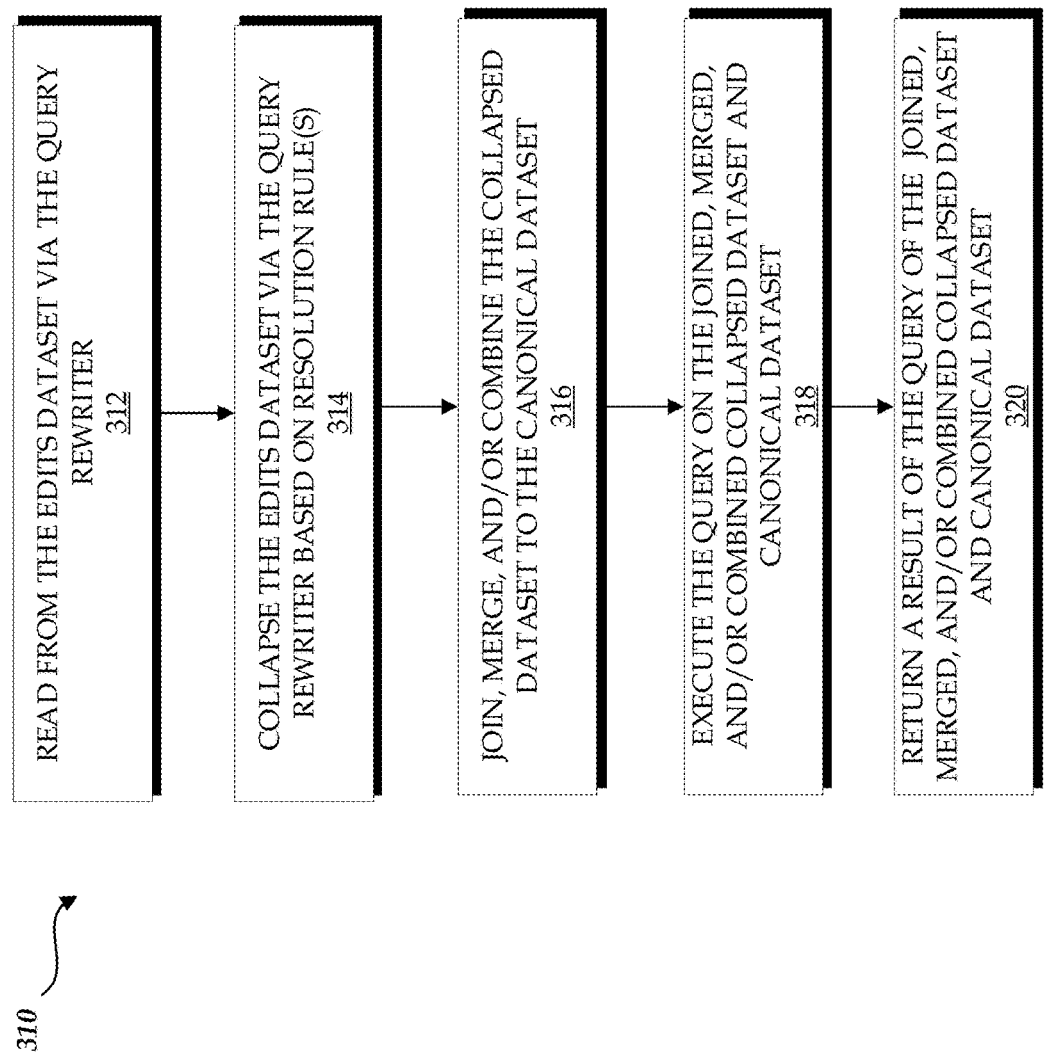
FIG. 3B is an example flow chart of the query workflow with the canonical dataset, query rewriter and edits datasets.

FIG. 3B is an example flow chart 310 of the query workflow with the canonical dataset 156, query rewriter 153 and edits datasets 154.

At block 312, the database system 150 reads from the edits dataset 154 via the query rewriter 153.

At block 314, the edits dataset 154 is collapsed via the query rewriter 153 based on one or more resolution rules. For example, the edits dataset 154 can be collapsed by de-duplicating data, removing one or more rows, removing one or more columns, sorting the data, and so forth. The result is a collapsed edits dataset.

At block 316, the collapsed edits dataset is joined, merged, and/or combined to the canonical dataset 156. Examples of this are shown in FIG. 2C.

At block 318, a query is executed on the joined, merged, and/or combined dataset (obtained from block 316 by consolidating the collapsed edits dataset and canonical dataset 156).

At block 320, a result of the query of the joined, merged, and/or combined dataset (obtained from block 316 by consolidating the collapsed edits dataset and canonical dataset 156) is returned.

Figure 3C:
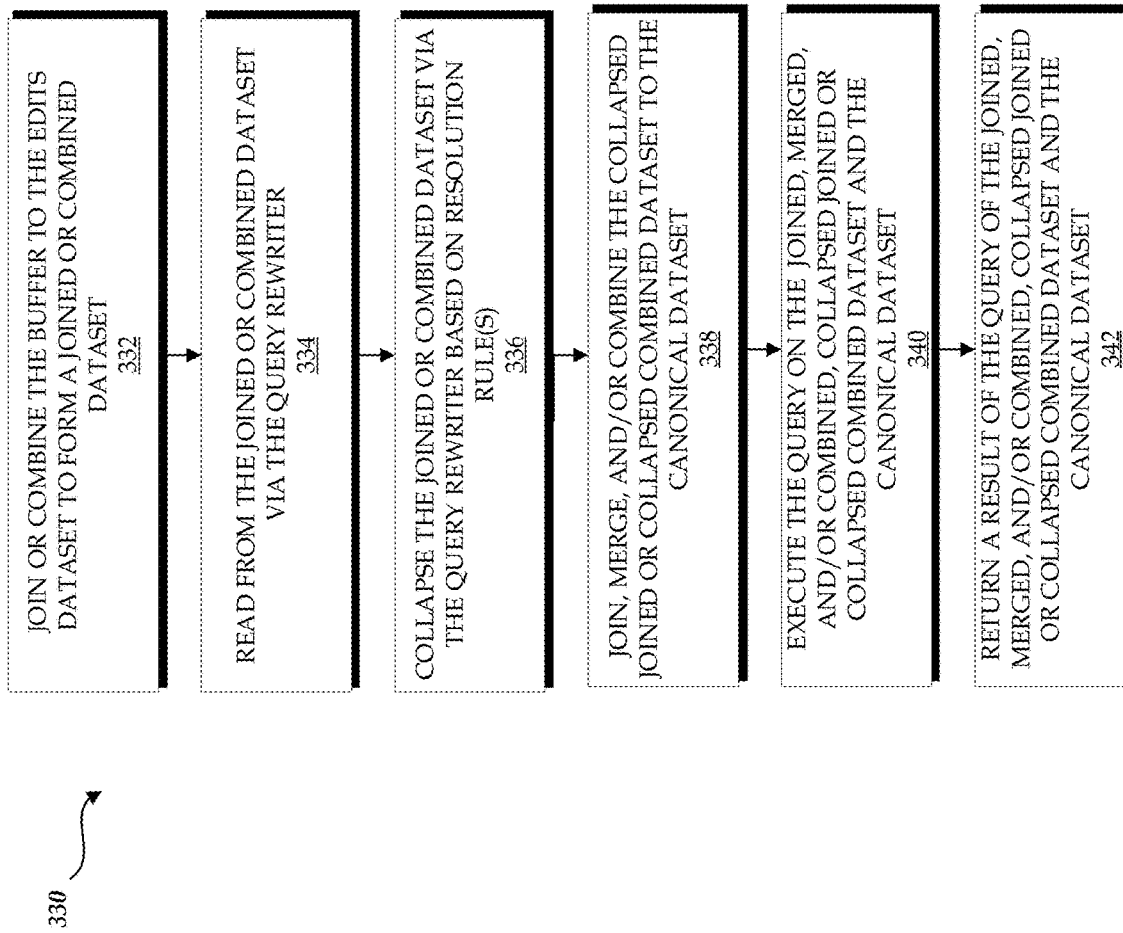
FIG. 3C is an example flow chart of the data and query workflow with the canonical dataset, query rewriter, and edits datasets.

FIG. 3C is an example flow chart 330 of the data and query workflow with the canonical dataset 156, query rewriter 153, and edits dataset 154. More specifically, the example flow chart 330 illustrates the read time resolution of a synthesized view of the current state of the data contained in the canonical dataset 156 in response to a query.

After the database system 150 receives a query associated with the canonical dataset 156, the query rewriter 153 of the database system 150 may rewrite the query in order to perform a read time resolution of a synthesized view of the contents between the canonical dataset 156, edits dataset 154, and buffer 158. This may have the practical effect of applying the edits that are contained within the edits dataset 154 and buffer 158 to the data of the canonical dataset 156 in order to generate a current view of the data of the canonical dataset 156.

At block 332, the contents of the buffer 158 may be joined or combined with the edits dataset 154 in order to form a joined or combined edits dataset. Examples of this are shown in FIGS. 2D and 2E. For example, the edits in the buffer 158 may be appended to the existing edits contained in the edits dataset 154, and each of the edits may have a timestamp associated with it.

At block 334, the database system 150 reads from the joined or combined edits dataset via the query rewriter 153.

At block 336, the database system 150 collapses the joined or combined edits dataset via the query rewriter 153 based on one or more resolution rules. For instance, the resolution rules may dictate de-duplicating data, removing one or more rows, removing one or more columns, sorting the data, and so forth. As an example, the most-recent edit for each data item (determined using the timestamps) in the joined or combined dataset may be kept and any intervening edits for that data item (which do not affect the "current" state of that data item) may be thrown away.

At block 338, the collapsed joined/combined edits dataset is joined, merged, and/or combined with the canonical dataset 156. For example, the edits in the collapsed joined/ combined dataset can be appended to the canonical dataset 156 (e.g., as in step 230 in FIG. 2E).

At block 340, the query is executed on the resulting joined, merged and/or combined dataset from block 338 (e.g., obtained from consolidating the collapsed joined/combined edits dataset and the canonical dataset 156).

At block 342, a result of the query of the resulting joined, merged and/or combined dataset from block 338 (e.g., obtained from consolidating the collapsed joined/combined edits dataset and the canonical dataset 156) is returned. More specifically, block 338 generates a synthesized view of the "current" state of the data by applying accrued edits to the canonical dataset 156, block 340 runs the query on that view, and block 342 returns the same query results as if all the data were only stored in a canonical dataset and all edits were made directly to that canonical dataset.

As a specific example of this workflow being implemented, in some embodiments, the canonical dataset 156 may store historical data and it can be initially constructed using a batch update mechanism. For situations in which there is a lower rate of streaming data (e.g., not as high throughput and on a longer time scale) that is typically processed and combined with the historical data in the canonical dataset 156, or for situations in which there is no streaming data and new data or edits are applied to the canonical dataset 156 at a slower rate, new data and edits can be written to the buffer 158. From time to time, those edits can be flushed to the edits dataset 154. When a query associated with the canonical dataset 156 is received, the query rewriter 153 may rewrite any canonical dataset references in order to perform a read time resolution of a synthesized view across the canonical dataset 156, edits dataset 154, and buffer 158.

This can be thought of as a full join between the canonical dataset 156, the edits dataset 154, and the contents of the buffer 158, with the query rewriter 153 coalescing values between the three components based on a resolution policy (e.g., "last write wins"' resolution policy). For example, the contents of the buffer 158 may be joined with the edits dataset 154 at block 332. At blocks 334 and 336, the resulting combined dataset can be collapsed by taking the most-recent edits for each data item, and the collapsed combined dataset can be combined with the canonical dataset 156, which can be collapsed further by applying the most-recent edits for each data item to the existing data in the canonical dataset 156. The result is a synthesized view of the current state of the data which can be rendered and displayed to a user.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
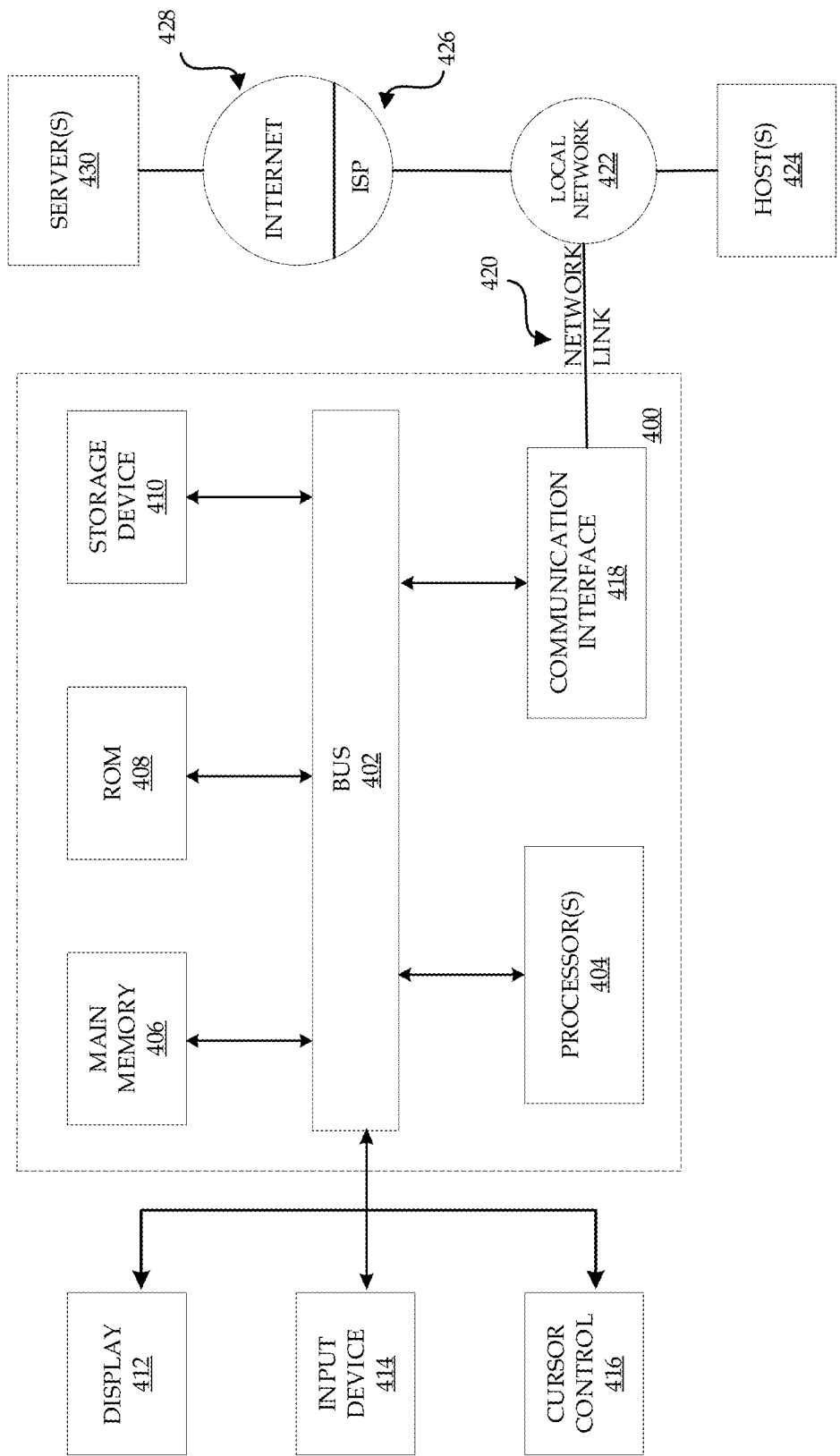
FIG. 4 illustrates a computer system with which certain methods discussed herein may be implemented.

For example, FIG. 4 is a block diagram that illustrates a computer system 400 upon which various embodiments may be implemented. Computer system 400 includes a bus 402 or other communication mechanism for communicating information, and a hardware processor, or multiple processors, 404 coupled with bus 402 for processing information. Hardware processor(s) 404 may be, for example, one or more general purpose microprocessors.

Computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

Computer system 400 may be coupled via bus 402 to a display 412, such as a cathode ray tube (CRT) or LCD display (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 400 may include a user interface module to implement a GUI that may be stored in a mass storage device as computer executable program instructions that are executed by the computing device(s). Computer system 400 may further, as described below, implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more computer readable program instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

Various forms of computer readable storage media may be involved in carrying one or more sequences of one or more computer readable program instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicate with a WAN). Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
one or more non-transitory computer readable storage mediums having program instructions embodied therewith; and
one or more processors configured to execute the program instructions to cause the system to:
receive one or more edits to be made to a first dataset;
temporarily store the one or more edits in a buffer;
dump the buffer to a second dataset by:
appending the one or more edits to the second dataset; and
flushing the one or more edits from the buffer; and
in response to receipt of a query of the first dataset:
collapse the second dataset based on one or more resolution rules;
join the collapsed second dataset to the first dataset;

execute the query on the join between the collapsed second dataset and the first dataset; and return a result of the query executed on the join between the collapsed second dataset and the first dataset.

2. The system of claim 1, wherein the one or more processors are configured to execute the program instructions to further cause the system to:

receive one or more additional edits to be made to the first dataset;

temporarily store the one or more additional edits in the buffer; and in response to receipt of a second query of the first dataset:
join the buffer to the second dataset to form a joined second dataset;
collapse the joined second dataset based on one or more resolution rules;
join the collapsed joined second dataset to the first dataset;
execute the query on the join between the collapsed joined second dataset and the first dataset; and
return a result of the query executed on the join between the collapsed joined second dataset and the first dataset.

3. The system of claim 1, wherein dumping the buffer to the second dataset is performed periodically.

4. The system of claim 1, wherein dumping the buffer to the second dataset is performed when contents of the buffer reach a certain size.

5. The system of claim 1, wherein the one or more edits to be made to the first dataset are provided by a user via a user interface.

6. The system of claim 1, wherein the returning the result of the query executed on the join comprises:
generating user interface data for a user interface configured to present the result of the executed query; and
displaying the user interface to a user.

7. The system of claim 1, wherein the one or more resolution rules specify that, for any data item, a most-recent edit for that data item is to be kept in the second dataset.

8. The system of claim 1, wherein each edit stored in the buffer comprises a row key and a timestamp, wherein the timestamp is associated with a time the respective edit was written to the buffer.

9. The system of claim 1, wherein the second dataset comprises all the edits dumped from the buffer.

10. The system of claim 1, wherein the one or more processors are configured to execute the program instructions to further cause the system to:
generate a collapsed form of the second dataset by determining a most-recent edit for each row based on a row key associated with each edit in the second dataset.

11. The system of claim 1, wherein the one or more processors are configured to execute the program instructions to further cause the system to:
rewrite the query to be applied to the join between the collapsed joined second dataset and the first dataset.

12. A computer-implemented method comprising:
receiving one or more edits to be made to a first dataset;
temporarily storing the one or more edits in a buffer;
dumping the buffer to a second dataset by:
appending the one or more edits to the second dataset; and
flushing the one or more edits from the buffer; and in response to receipt of a query of the first dataset:
collapsing the second dataset based on one or more resolution rules;
joining the collapsed second dataset to the first dataset;
executing the query on the join between the collapsed second dataset and the first dataset; and
returning a result of the query executed on the join between the collapsed second dataset and the first dataset.

13. The computer-implemented method of claim 12, further comprising:
receiving one or more additional edits to be made to the first dataset;
temporarily storing the one or more additional edits in the buffer; and
in response to receipt of a second query of the first dataset:
joining the buffer to the second dataset to form a joined second dataset;
collapsing the joined second dataset based on one or more resolution rules;
joining the collapsed joined second dataset to the first dataset;
executing the query on the join between the collapsed joined second dataset and the first dataset; and
returning a result of the query executed on the join between the collapsed joined second dataset and the first dataset.

14. The computer-implemented method of claim 12, wherein dumping the buffer to the second dataset is performed periodically.

15. The computer-implemented method of claim 12, wherein dumping the buffer to the second dataset is performed when contents of the buffer reach a certain size.

16. The computer-implemented method of claim 12, wherein the one or more resolution rules specify that, for any data item, a most-recent edit for that data item is to be kept in the second dataset.

17. Non-transitory computer-readable media including computer-executable instructions that, when executed by a computing system, cause the computing system to perform operations comprising:
receiving one or more edits to be made to a first dataset;
temporarily storing the one or more edits in a buffer;
dumping the buffer to a second dataset by:
appending the one or more edits to the second dataset; and
flushing the one or more edits from the buffer; and
in response to receipt of a query of the first dataset:
collapsing the second dataset based on one or more resolution rules;
joining the collapsed second dataset to the first dataset;
executing the query on the join between the collapsed second dataset and the first dataset; and
returning a result of the query executed on the join between the collapsed second dataset and the first dataset.

18. The non-transitory computer-readable media of claim 17, wherein dumping the buffer to the second dataset is performed periodically.

19. The non-transitory computer-readable media of claim 17, wherein dumping the buffer to the second dataset is performed when contents of the buffer reach a certain size.

20. The non-transitory computer-readable media of claim 17, wherein the one or more resolution rules specify that, for any data item, a most-recent edit for that data item is to be kept in the second dataset.

* * * * *